E. A. SPERRY.
DEAD BEAT INCLINOMETER.
APPLICATION FILED MAR. 12, 1915.

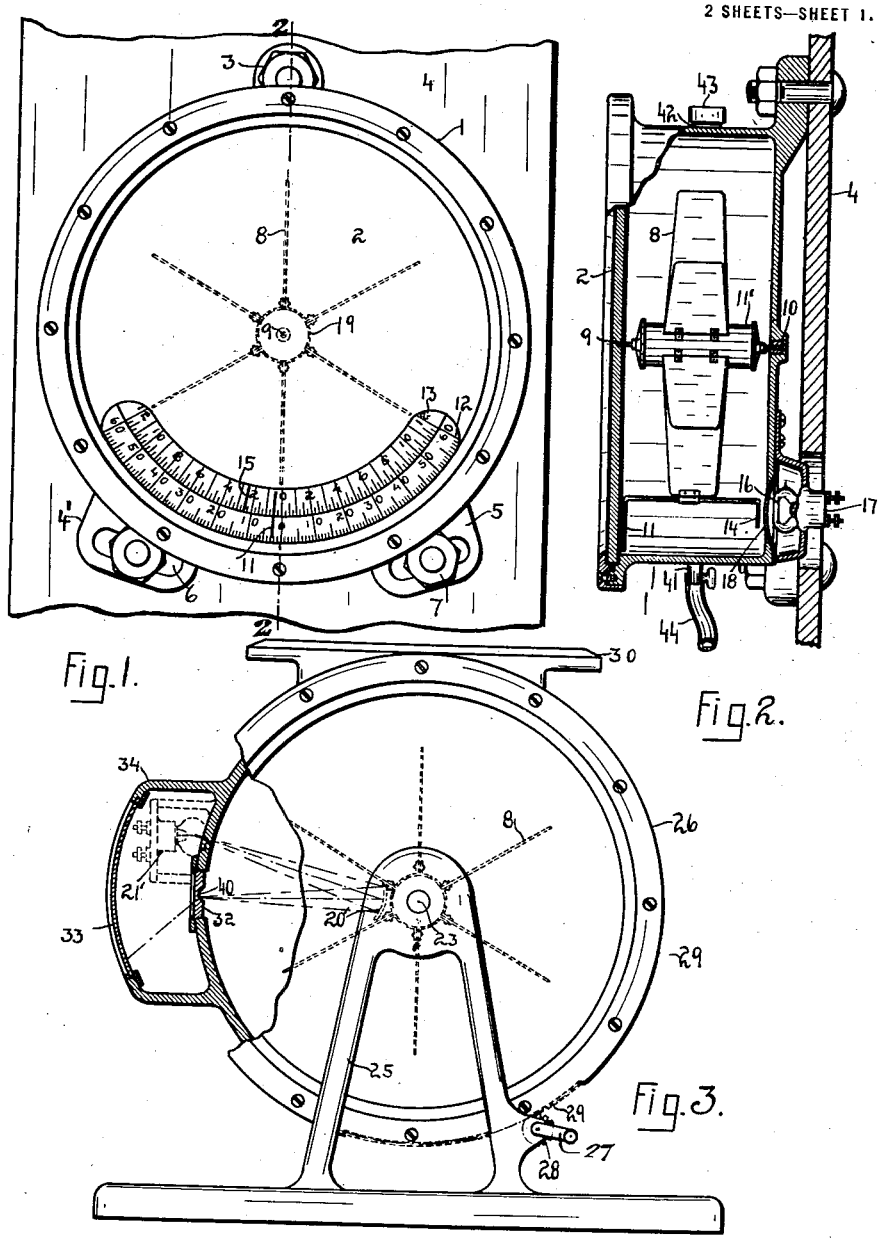

1,366,430.

Patented Jan. 25, 1921.
2 SHEETS—SHEET 2.

WITNESSES:

INVENTOR.
ELMER A. SPERRY
BY Herbert H. Thompson,
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

DEAD-BEAT INCLINOMETER.

1,366,430. Specification of Letters Patent. Patented Jan. 25, 1921.

Application filed March 12, 1915. Serial No. 13,986.

*To all whom it may concern:*

Be it known that I, ELMER A. SPERRY, a citizen of the United States of America, residing at Brooklyn, New York, have invented certain new and useful Improvements in Dead-Beat Inclinometers, of which the following is a specification.

This invention relates to instruments for maintaining or indicating the true vertical or horizontal position on a ship or other vehicle. More particularly my invention relates to an improvement in the type of instrument known as dead-beat clinometers, although my invention may also be embodied in other types of instruments, such as artificial horizon apparatus, and the like.

The objects of my invention are to eliminate the sources of error in the present type of this instrument. Errors are chiefly due to the following causes: the disturbing influence of acceleration pressures, slowness in coming to rest if disturbed, friction about the axis of support, and the inability of the average observer to read the indicated inclination accurately.

Referring to the drawing, in which several of the many forms my invention may assume, are shown, Figure 1 is a front elevation of one form of inclinometer.

Fig. 2 is a vertical section of the same on line 2, 2 Fig. 1.

Fig. 3 is a front elevation, partly in section of my invention used as an artificial horizon.

Figures 4, 5:
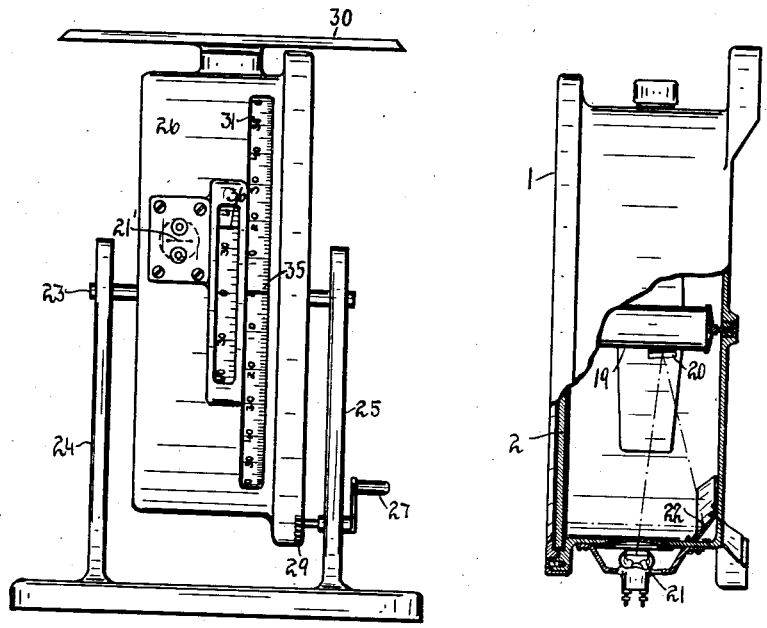
Fig. 4 is a side elevation thereof.
Fig. 5 is a side view, partly in section, of another modification.
Figure 6:
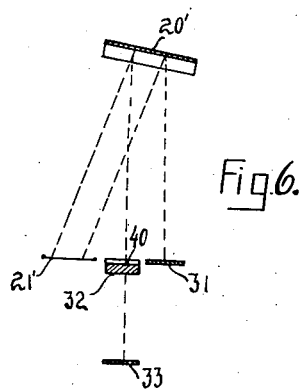
Fig. 6 is a diagrammatic view of the angle multiplying device of Figs. 3 and 4.

The instrument comprises essentially a closed cylindrical casing 1, the entire front of which is preferably made of glass 2. Said casing may be provided with perforated ears 3, 4' and 5, whereby it may be secured to a vertical support 4. The casing is made adjustable about pivot 3, so that it may be secured in the required relation to the inclinometer proper, preferably by making ears 4' and 5 with elongated perforations 6, in which the securing bolts 7 may be adjusted.

Wholly within the casing is mounted the inclinometer proper, which comprises a system 19 of radial vanes 8, delicately pivoted in frictionless bearings 9 and 10, on a horizontal axis. These vanes are secured to a central hub 11', and extend out symmetrically in fan-like formation so as to offer a maximum resistance to any relative movement between the vanes and the medium in which they are immersed. The casing 1 is entirely filled with a liquid, all air being carefully excluded. While I do not limit myself to the use of any particular liquid, I prefer to use a transparent liquid with low viscosity, and comparatively high specific gravity, such that it is about equal to the specific gravity of the vane system, as a whole.

In order to completely fill the casing with liquid and exclude all of the air, I provide near the bottom of the casing a valve or stop-cock 41, and near the top a threaded tap 42 adapted to be closed by a cap 43. To fill the casing, I attach a hose or tubing 44 on the stop-cock and immerse the lower end in the liquid to be drawn into the casing. I then remove cap 43 and attach an exhaust pump, which removes the air in the casing and at the same time draws up the liquid.

As shown, the pivots 9 and 10 are located at or near the center of the axis of the cylindrical casing, and the vanes are centrally located between the end walls so that an equal amount of liquid lies between each vane and the casing. It should also be noted that the vanes are made considerably shorter than the radius of the casing, and also that their sides are well spaced from the end walls of the casing, both of which features contribute toward securing a large percentage of the mass of the liquid lying near the walls of the casing unswept by the revolving vanes. Preferably I leave about the same space between the tops of the vanes and the end walls.

The vane system is made pendulous about its pivots 9—10, but only very slightly so, the center of gravity being but little below the pivots. Preferably also the vane system is so designed that its center of gravity is below the center of buoyancy, so that a righting couple due to displacement of the center of gravity with respect to the center of buoyancy will be exerted in addition to the couple due to the pendulous suspension, whenever the system is displaced from its position of equilibrium.

According to the form of the invention shown in Figs. 1 and 2, the position of the vane system or inclinometer proper, is indicated by providing the system with an index or pointer 11, which is readable on a scale 12, preferably etched on the glass front 2. The pointer may be attached to one of the vanes 8, as shown. The interior walls of the casing may be made of a light reflecting character so that the pointer may be plainly seen.

Adjacent scale 12 may be located a second scale 13 designed to be read in connection with a second pointer 14. Both pointers 11 and 14 may be formed from a single piece of bent wire attached to a vane 8. That part of the glass on which scale 13 is etched is preferably frosted, so that pointer 14 is not directly visible, but so that its shadow 15 thrown from a source of light 16 can be plainly seen. Said source of light consists preferably of a single filament incandescent lamp 17 mounted in the rear of the casing, the light entering through a window 18.

The filament extends parallel to pointers 11 and 14 so that sharp shadows will be produced. It will readily be seen that lamp 17, pointer 14 and scale 13 furnish an accurate angle multiplying device whereby the actual angle produced on scale 13 may be made any desired multiple of that produced on scale 12, depending on the ratio of the distance between the lamp filament and pointer 14 and the distance between pointer 14 and ground glass 2.

Another means of multiplying the angle is shown in Fig. 5, in connection with a similar type of clinometer. According to this modification, a mirror 20 is mounted on the vane system 19 so as to turn therewith. A lamp 21 similar to lamp 17 is secured to the bottom of casing 1. The image of the filament is reflected by mirror 20 into a stationary mirror 22 set so as to throw the image onto a scale on the glass front 2, similar to scale 13. Mirror 20 is preferably convex in a plane perpendicular to the paper so as to increase the brilliancy of the image on the scale, as will be readily apparent from an inspection of Fig. 3, described hereinafter.

Figs. 3 and 4 show another embodiment of my invention in which it assumes the form of an artificial horizon apparatus. A different form of angle multiplying device is also shown in connection with this modification. The entire casing 26 in this instance is rotatably mounted on a horizontal axis 23, by means of spaced uprights 24, 25.

A handle 27 may be provided to rotate the casing by means of a pinion 28, which meshes with a gear sector 29 on the circumference of the casing. On top of the casing is provided the usual horizontal mirror 30.

The indications of the vane system 19 are read by means of a transparent scale 31 in the side of the casing. A lamp 21' similar to lamp 21 is secured to the side of the casing in such a position that the image 35 of its filament is reflected by concave mirror 20' directly on to scale 31.

Preferably I make scale 31 very narrow so as to only intercept a portion of the rays from the filament, and I mount adjacent said scale within the path of the rays a prism 32 designed to multiply the angle through which the rays are turned. To this end the prism is provided with a shallow cylindrical cavity 40, the center of which is exactly on the zero position of the beam from lamp 21'. This cavity may be made to extend to each side of this center line an arc of but one degree on scale 31 and designed so as to bend the rays when moved through one degree through many times that angle.

A second scale 33 graduated to correspond to the angle thus produced is provided in an extension 34 on the casing on which scale the refracted image 36 is thrown. To operate this form of the device, one need only keep the two indices or images 35 and 36 directly in line and on the zero graduations, by adjusting crank 27. It will readily be seen that the mirror 30 will be maintained in a horizontal position by this means regardless of the inclination of the object on which the instrument is placed.

To understand the advantages secured by my invention, let us recall the sources of error in the existing types of inclinometers and observe how they are eliminated by my invention:

First, errors arising from acceleration pressures are practically eliminated by making the ballistic or pendulous factor of the system very small compared to the mass in equilibrium. This mass, it should be remembered, includes not only nearly the entire weight of the vane system 19 but also the entire mass of liquid within the casing, while the mass of the ballistic need be no greater than that of the pointers 11 and 14.

Second, friction about the supporting pivots is reduced to a minimum by floating the vane system in the liquid, so that no pressure is exerted on the bearings 9 and 10.

Third, the directive force is increased by arranging the center of gravity of the vane system below its center of buoyancy or metacenter.

Fourth, the accuracy of the readings is increased by a suitable angle multiplying device.

In accordance with the provisions of the patent statutes, I have herein described the principle of operation of my invention, together with the apparatus which I now consider to represent the best embodiment thereof, but I desire to have it understood that the apparatus shown is only illustrative, and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A dead beat indicator comprising a casing containing a liquid, a pendulous device pivoted in said casing, the ballistic of said device being small as compared to the mass of the device and liquid, said device comprising a central hollow hub and thin, radial vanes extending out therefrom into the body of the liquid.

2. A dead beat indicator comprising a casing containing a liquid, a pendulous device pivoted in said casing, the ballistic of said device being small as compared to the mass of the device and liquid, and the specific gravity of said device approximately equal to that of said liquid, said device comprising a central hollow hub and radial vanes extending out therefrom into the body of the liquid.

3. A dead beat indicator comprising a casing containing a liquid, a buoyant device pivoted in said casing, the ballistic of said device being small as compared to the mass of the device and liquid, and the specific gravity of said device approximately equal to that of said liquid, said device including means for opposing relative movement between said device and the liquid, and having its center of gravity below its center of buoyancy.

4. An artificial horizon comprising a pivoted casing containing a liquid, a pendulous device comprising a plurality of radial vanes within the casing, means for indicating the relative position of said device and casing, and means whereby said casing may be rotated to maintain the device and casing in the same relative position.

5. An inclinometer comprising a casing containing a liquid, a buoyant system of vanes pivoted in said casing, the center of gravity of said system being below the center of buoyancy and an optical angle multiplying device adapted to indicate the angle of relative movement between said casing and vane system.

6. An inclinometer comprising a closed cylindrical casing, a buoyant and slightly pendulous system of radial vanes pivoted within said casing, the pivots being wholly within the casing and the length of the vanes being much less than the radius of the casing, said casing being de-aerated and filled with a liquid, and a visible scale and index mounted on said casing and vane system respectively.

7. In an angle measuring device, a plurality of scales in juxtaposition, a plurality of indices for the scales, one of said indices being directly readable on its scale, a source of light, another of said indices being located between its scale and said source of light, whereby its apparent angular movement is multiplied.

8. An inclinometer comprising a closed cylindrical casing provided with smooth interior walls, a limpid liquid filling said casing, a buoyant and slightly pendulous system of vanes pivoted in said casing, a plurality of pointers on said system, a plurality of scales of different graduation characteristics on said casing, certain of said scales and pointers showing the true angle of inclination, while other of said scales and pointers magnify said angle.

9. An inclinometer comprising a closed cylindrical casing provided with smooth interior walls, a limpid liquid filling said casing, a buoyant system of radial vanes pivoted within the casing so as to be completely submerged, a large percentage of the mass of the liquid lying adjacent the walls of the casing being unswept by the revolving vanes, said system having its center of gravity below its center of buoyancy.

10. An inclinometer comprising a closed cylindrical casing, a buoyant system of radial vanes pivoted wholly within said casing, a liquid within said casing and completely surrounding said system and indicating means controlled by said system.

11. An inclinometer comprising a closed cylindrical casing, a system of radial vanes pivoted wholly within said casing, said system being heavier below than above its center of gravity, a transparent liquid within said casing and completely surrounding said system, the weight of the liquid displaced by said system being substantially the same as the weight of said system and indicating means controlled by said system.

In testimony whereof, I have signed my name to this specification in the presence of two subscribing witnesses, this 21st day of January 1915.

ELMER A. SPERRY.

Witnesses:
ALBERT W. STRINGHAM,
EARL W. CHAFEE.